United States Patent
Ansell et al.

(10) Patent No.: US 6,367,019 B1
(45) Date of Patent: Apr. 2, 2002

(54) COPY SECURITY FOR PORTABLE MUSIC PLAYERS

(75) Inventors: Steven T. Ansell, Fremont; Andrew R. Cherenson, Los Altos; Mark E. Paley, San Carlos; Steven B. Katz, Santa Monica, all of CA (US); John Michael Kelsey, Jr., Jefferson City, MO (US); Bruce Schneier, Oak Park, IL (US)

(73) Assignee: Liquid Audio, Inc., Redwood City, CA (US)

( * ) Notice: Subject to any disclaimer, the term of this patent is extended or adjusted under 35 U.S.C. 154(b) by 0 days.

(21) Appl. No.: 09/277,439

(22) Filed: Mar. 26, 1999

(51) Int. Cl.[7] ................................................. G06F 11/30
(52) U.S. Cl. ....................... 713/201; 713/155; 713/171; 380/277; 380/278
(58) Field of Search ................................. 713/155, 156, 713/171, 170, 175, 200, 201; 380/277, 278, 279, 281

(56) References Cited

U.S. PATENT DOCUMENTS

| | | | |
|---|---|---|---|
| 4,747,139 A | 5/1988 | Taaffe | 380/44 |
| 4,817,140 A | 3/1989 | Chandra et al. | 380/4 |
| 5,003,410 A | 3/1991 | Endoh et al. | 360/60 |
| 5,033,084 A | 7/1991 | Beecher | 380/4 |
| 5,034,980 A | 7/1991 | Kubota | 380/4 |
| 5,155,768 A | 10/1992 | Matsuhara | 380/23 |
| 5,199,066 A | 3/1993 | Logan | 380/4 |
| 5,418,713 A | 5/1995 | Allen | 364/403 |
| 5,592,651 A | 1/1997 | Rackman | 395/490 |
| 5,636,276 A | 6/1997 | Brugger | 380/4 |
| 5,661,799 A | 8/1997 | Nagel et al. | 380/4 |
| 5,677,953 A | 10/1997 | Dolphin | 380/4 |
| 5,734,823 A | 3/1998 | Saigh et al. | 395/200.06 |
| 5,734,891 A | 3/1998 | Saigh | 395/610 |
| 5,745,568 A | 4/1998 | O'Connor et al. | 380/4 |
| 5,754,649 A | 5/1998 | Ryan et al. | 380/4 |
| 5,757,907 A | 5/1998 | Cooper et al. | 380/4 |
| 5,778,421 A | 7/1998 | Nagano et al. | 711/115 |
| 5,794,217 A | 8/1998 | Allen | 705/27 |
| 5,857,021 A | 1/1999 | Kataoka et al. | 380/4 |
| 6,189,098 B1 * | 2/2001 | Kaliski, Jr. | 713/168 |

FOREIGN PATENT DOCUMENTS

| | | | | |
|---|---|---|---|---|
| EP | 0 756 279 A2 | 1/1997 | | G11B/20/00 |
| WO | WO 97/44736 | 11/1997 | | G06F/12/14 |

* cited by examiner

*Primary Examiner*—Thomas R. Peeso
(74) *Attorney, Agent, or Firm*—James D. Ivey

(57) ABSTRACT

Data such as a musical track is stored as a secure portable track (SPT) which can be bound to one or more players and can be bound to a particular storage medium, restricting playback of the SPT to the specific players and ensuring that playback is only from the original storage medium. The SPT is bound to a player by encrypting data of the SPT using a storage key which is unique to the player, is difficult to change, and is held in strict secrecy by the player. The SPT is bound to a particular storage medium by including data uniquely identifying the storage medium in a tamper-resistant form, e.g., cryptographically signed. The SPT can also be bound to the storage medium by embedding cryptographic logic circuitry, e.g., integrate circuitry, in the packaging of the storage medium. The SPT is bound by encrypting an encryption key using the embedded logic. By using unique cryptographic logic, only that particular storage medium can decrypt the encryption key and, therefore, the data of the SPT encrypted with the encryption key. To allow a user to playback the SPT on a number of players, players can share storage keys with one another. Such key sharing is done in a cryptographically secure manner. Before downloading an SPT to a particular external player, the ability of the external player to enforce restrictions placed upon the SPT is verified.

102 Claims, 12 Drawing Sheets

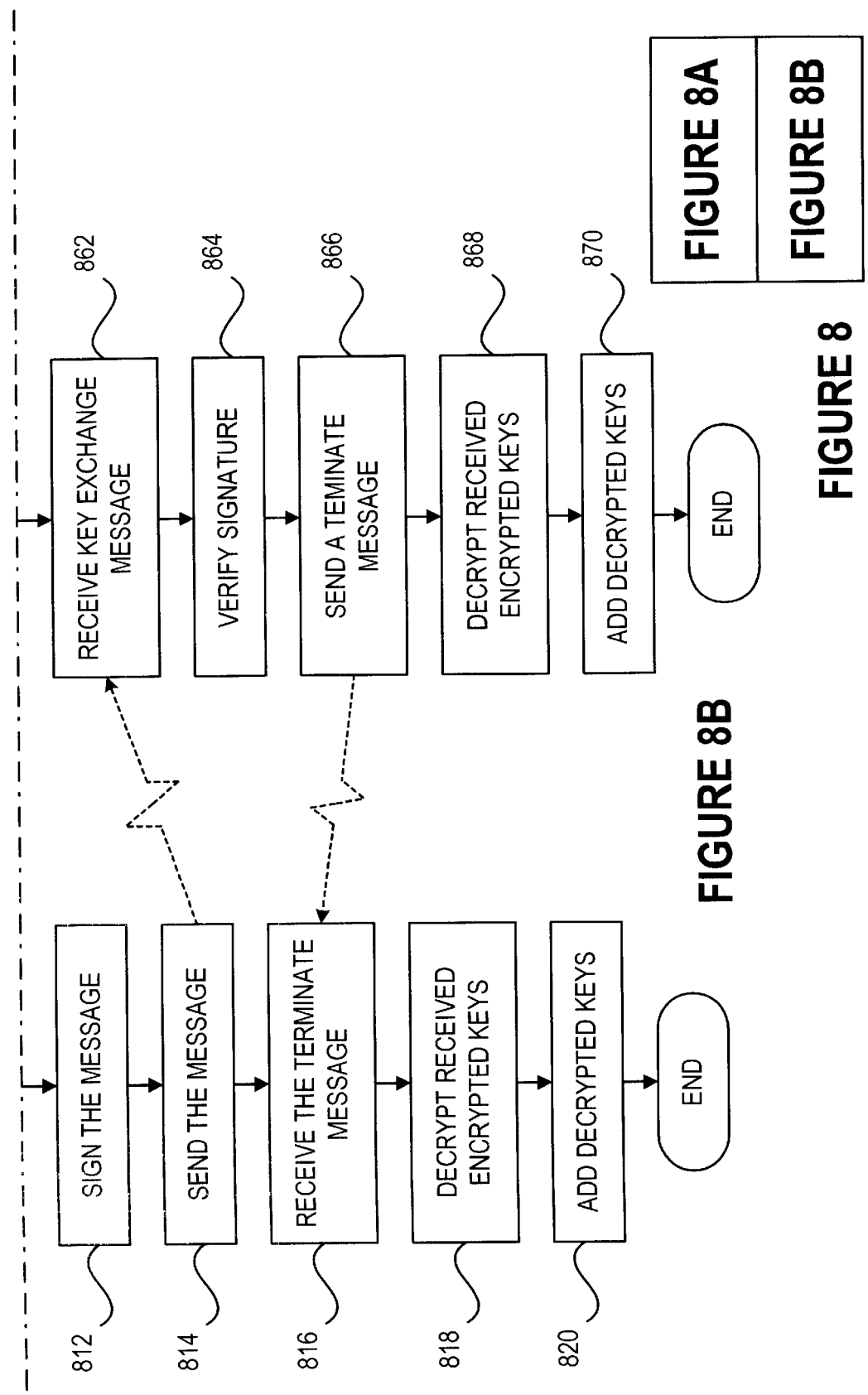

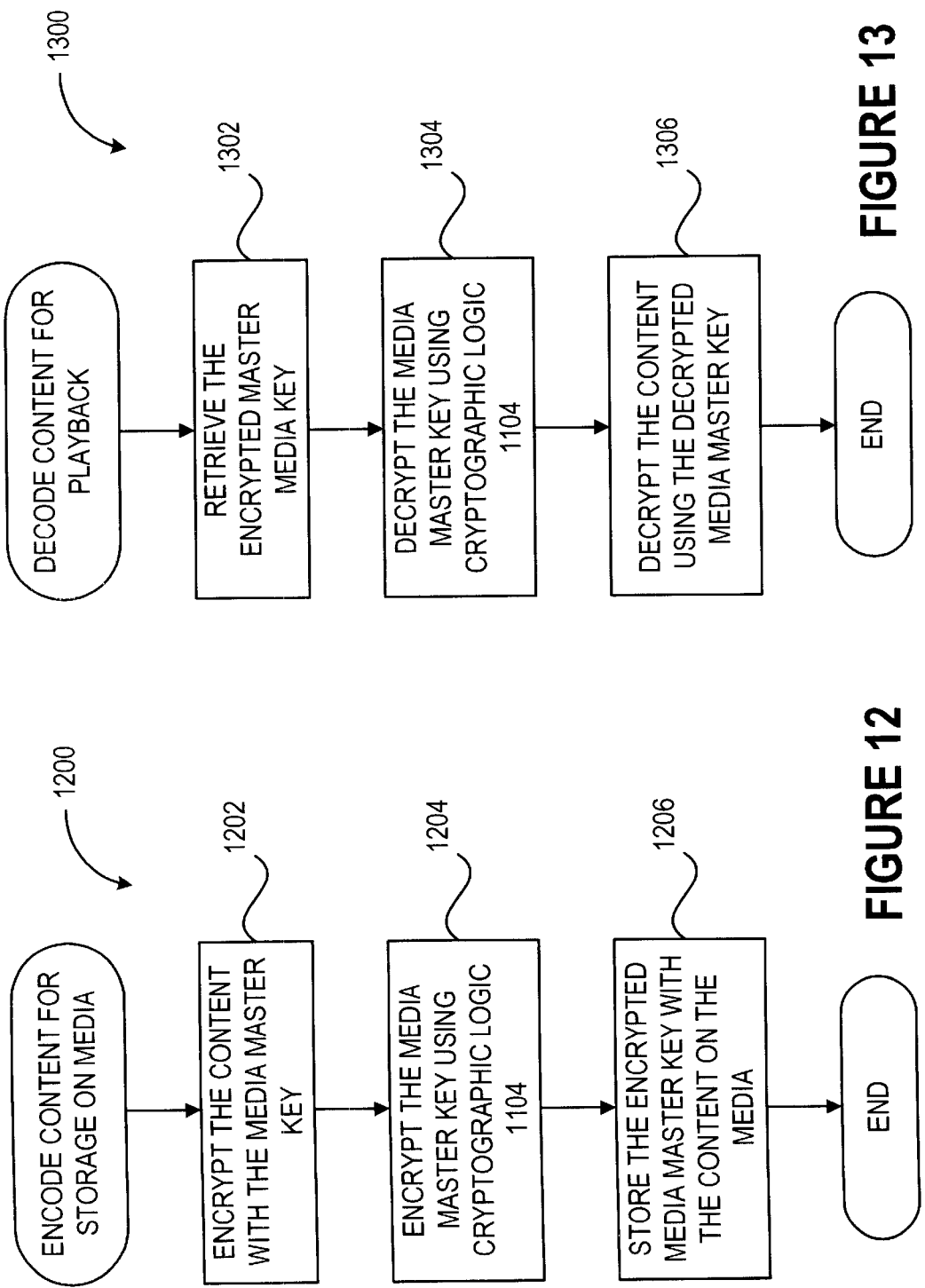

COPY SECURITY FOR PORTABLE MUSIC PLAYERS

FIELD OF THE INVENTION

The present invention relates to systems for distributing and playing digitized audiovisual signals and, in particular, to a mechanism for distributing and playing such digitized audiovisual signals such that unauthorized copying of such signals is discouraged to thereby protect intellectual property rights of artists.

BACKGROUND OF THE INVENTION

Recent advances in lossless compression of digitized audio signals and storage capacity has recently led to the development of music players which play CD-quality music stored in solidstate memory. For example, a number of MP3 players are available into which a user can download compressed, CD-quality digitized audio signals into solid-state memory for subsequent playback. "MP3" generally refers to the MP3 format which is the MPEG standard for audio coding (MPEG-1 Video, Layer 3 Audio, ISO Standard #1172-3). The MP3 format provides excellent sound quality at a data rate of 128 Kbits (44 KHz, 16-bit samples, stereo).

While MP3 players provide very good sound quality and great convenience for the user, MP3 players provide essentially no protection whatsoever against unauthorized copying of copyrighted works. Currently, a number of computer systems provide free access to copyrighted musical works through the Internet. A user who is in possession of a digitized, copyrighted music signal in the MP3 format can, albeit most likely in violation of copyright laws, distribute unlimited identical digital copies of the music signal to friends with no compensation whatsoever to the copyright holder. Each such copy suffers no loss of quality from the original digitized music signal.

A few attempts have been made to thwart the unauthorized proliferation of perfect digital copies of digitized audiovisual signals. One such technique is used in minidisc and digital audio tape (DAT) devices. To allow transfer of previously purchased digitized audio signals, one digital-to-digital copy is permitted. In other words, digital copies of digital copies is prevented. Typically, a single bit in the storage medium indicates whether the stored signal is a digital copy. If content is written to the storage medium—e.g., either a minidisc or a DAT tape—through a digital port in a player/recorder, the bit is set to indicate that the content of the medium is a digital copy. Otherwise, the bit is cleared to indicate either an analog copy—content recorded through an analog port of the player/recorder—or that the content is an original recording, e.g., through a microphone.

This form of copy protection is insufficiently restrictive. For example, an owner of an audio DAT can distribute at least one unauthorized copy to another person. In addition, unlimited digital copies of a CD can be made onto minidiscs or DATs although each of those digital copies cannot be digitally copied. This form of copy protection can also be excessively restrictive, preventing an owner of a prerecorded audio medium to make copies for each of a number of players of the prerecorded audio owner, namely, players in the home, office, car, and for portable use.

As alluded to briefly above, the single-copy mechanism fails to prevent any copying of digital read-only media such as CDs. The content of such media is typically uncompressed and un-obscured such that unauthorized copying is unimpeded.

What is needed is a mechanism by which copyrightable content of digital storage media is protected against unauthorized copying while affording the owner of such digital storage reasonable unimpeded convenience of use and enjoyment of the content.

SUMMARY OF THE INVENTION

In accordance with the present invention, data such as a musical track is stored as a secure portable track (SPT) which can be bound to one or more specific external players and can be bound to the particular storage medium in which the SPT is stored. Such restricts playback of the SPT to the specific external players and ensures that playback is only from the original storage medium. Such inhibits unauthorized copying of the SPT.

The SPT is bound to an external player by encrypting data representing the substantive content of the SPT using a storage key which is unique to the external player, is difficult to change (i.e., is read-only), and is held in strict secrecy by the external player. Specifically, the data is encrypted using a master media key and the master media key is encrypted using the storage key. Since only the external player knows the storage key, the master media key is passed to the external player using a secure communication session and the external player encrypts the master media key using the storage key and returns the encrypted master media key. Accordingly, only the specific external player can decrypt the master media key and, therefore, the data representing the substantive content of the SPT.

The SPT is bound to a particular piece of storage medium by including data uniquely identifying the storage medium in a tamper-resistant form, e.g., cryptographically signed. The medium identification data is difficult to change, i.e., read-only. Prior to playback of the SPT, the external player confirms that the media identification data has not been tampered with and properly identifies the storage medium.

The SPT can also be bound to the storage medium by embedding logic circuitry, e.g., integrated circuitry, in the packaging of the storage medium for performing cryptographic processing. The SPT is bound by encrypting the master media key, which is used to encrypt the data representing the substantive content of the SPT, using the embedded logic. By using unique cryptographic logic in the packaging of the storage medium, only that particular storage medium can decrypt the master media key and, therefore, the substantive content of the SPT.

To allow a user to playback the SPT on a number of players, e.g., one in the home, one in the office, one in the car, etc., external players can share storage keys with one another. However, such key sharing must be done in a cryptographically secure manner to prevent crackers from attempting to collect storage keys from external players.

The two external players communicate with one another in a cryptographically secure session. One, the initiator, sends a request message which includes a certificate of the initiator and a first random number. The other, i.e., the responder, authenticates the initiator using the certificate and responds with a reply message. The reply message includes the certificate of the responder, the first random number, a second random number, and one or more storage keys of the responder encrypted with a public key of the initiator. The initiator authenticates the responder using the certificate and responds with an exchange message. The exchange message includes the first and second random numbers and one or more storage keys of the initiator encrypted with a public key of the responder. Thus, each has copies of the other's storage keys and can play SPTs bound to the other external player.

Before downloading an SPT to a particular external player, the ability of the external player to enforce restrictions placed upon the SPT is verified. During a registration process, the external player identifies those types of restrictions which can be enforced by the external player. Such types include a maximum number of times an SPT is played, an expiration time beyond which the SPT can no longer be played, and a number of copies of the SPT which can be made. For each type of restriction imposed upon a particular SPT, the external player is verified to be able to enforce that particular type of restriction,. If the external player is unable to enforce any of the restrictions imposed upon the SPT, downloading and/or binding of the SPT to the external player is refused. Otherwise, downloading and/or binding is permitted.

BRIEF DESCRIPTION OF THE DRAWINGS

FIG. 12 is a logic flow diagram of the encoding of content to bind the content to a storage medium in accordance with the present invention.

FIG. 13 is a logic flow diagram of the decoding of content to enforce a binding of the content to a storage medium in accordance with the present invention.

DETAILED DESCRIPTION

Figure 1:
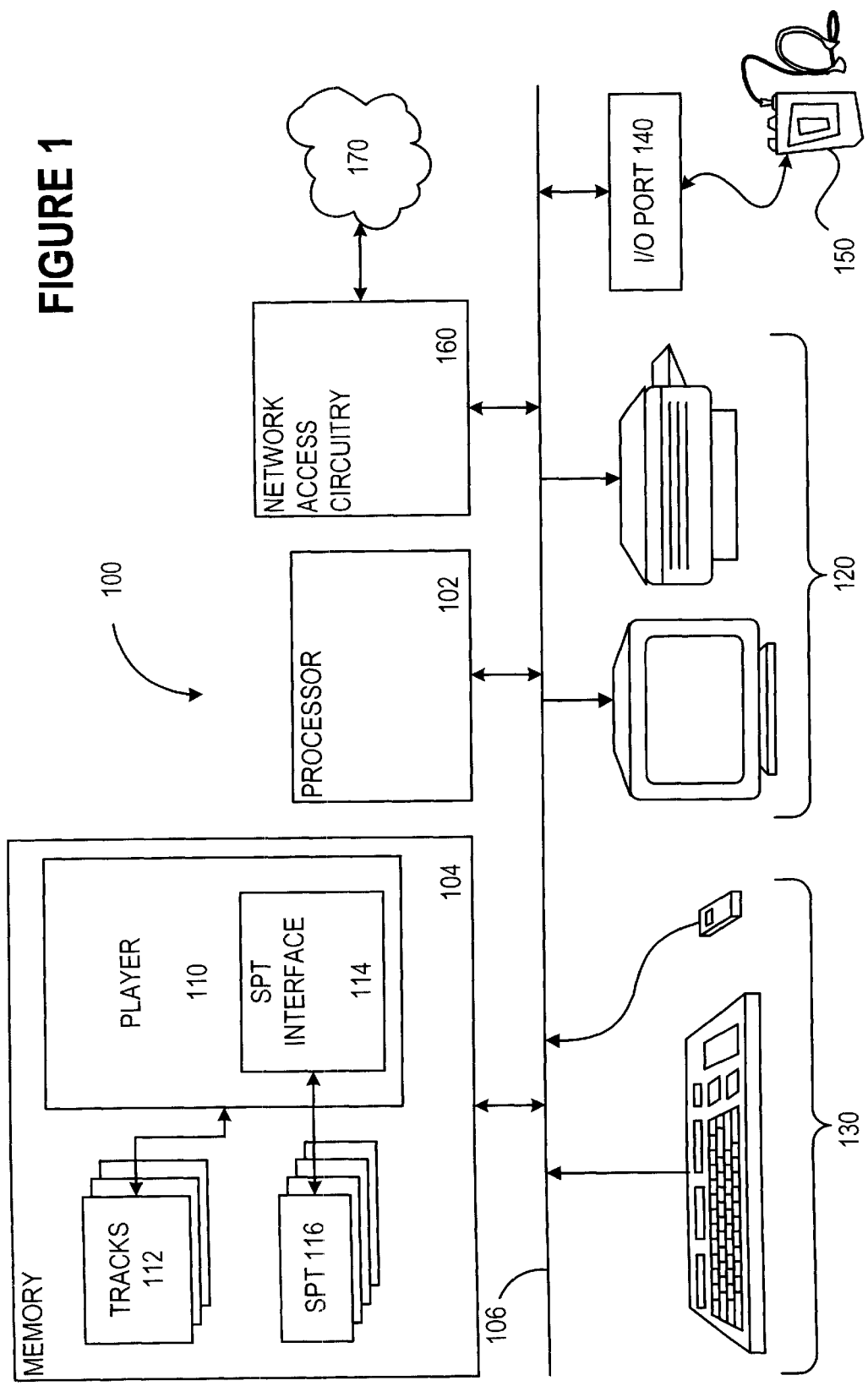
FIG. 1 is a block diagram of a computer system which includes a player, secure portable tracks, and an interface for an external player in accordance with the present invention.

In accordance with the present invention, data such as a musical track is stored as a secure portable track (SPT) which can be bound to one or more specific external players and can be bound to the particular storage medium in which the SPT is stored. Such restricts playback of the SPT to the specific external players and ensures that playback is only from the original storage medium. Such inhibits unauthorized copying of the SPT.

A brief overview of the operating environment of the secure portable music playing system according to the present invention facilitates appreciation and understanding of the present invention. Computer system 100 (FIG. 1) has a typical architecture. Computer system 100 includes a processor 102 and memory 104 which is coupled to processor 102 through an interconnect 106. Interconnect 106 can be generally any interconnect mechanism for computer system components and can be, e.g., a bus, a crossbar, a mesh, a torus, or a hypercube. Processor 102 fetches from memory 104 computer instructions and executes the fetched computer instructions. Processor 102 also reads data from and writes data to memory 104 and sends data and control signals through interconnect 106 to one or more computer display devices 120 and receives data and control signals through interconnect 106 from one or more computer user input devices 130 in accordance with fetched and executed computer instructions.

Memory 104 can include any type of computer memory and can include, without limitation, randomly accessible memory (RAM), read-only memory (ROM), and fixed and removable storage devices which include storage media such as magnetic and/or optical disks. Memory 104 includes a music player 110 which includes a secure portable track (SPT) interface 114 and which is all or part of one or more computer processes which in turn execute within processor 102 from memory 104. A computer process is generally a collection of computer instructions and data which collectively define a task performed by a computer system such as computer system 100. Thus, when a computer process, such as player 110, takes a particular action, in reality processor 102 executes computer instructions of the computer process and execution of those computer instructions causes the particular action to be taken.

Each of computer display devices 120 can be any type of computer display device including without limitation a printer, a cathode ray tube (CRT), a light-emitting diode (LED) display, or a liquid crystal display (LCD). Each of computer display devices 120 receives from processor 102 control signals and data and, in response to such control signals, displays the received data. Computer display devices 120, and the control thereof by processor 102, are conventional.

Each of user input devices 130 can be any type of user input device including, without limitation, a keyboard, a numeric keypad, or a pointing device such as an electronic mouse, trackball, lightpen, touch-sensitive pad, digitizing tablet, thumb wheels, or joystick. Each of user input devices 130 generates signals in response to physical manipulation by the listener and transmits those signals through interconnect 106 to processor 102.

Input/output (I/O) port 140 receives control signals from processor 102 through interconnect and, in response to the control signals, receives data from and sends data to processor 102. In addition, I/O port 140 sends data to and receives data from a device which can be coupled to I/O port 140. In this embodiment, a secure portable music player 150 is coupled to I/O port 140. I/O port 140 can be, for example, a serial port or a parallel port. Secure portable music player 150 is sometimes referred to herein as portable player 150.

Network access circuitry 160 couples computer system 100 to a computer network 170 which can be, for example, an intranet or internet. Network access circuitry 160 implements data transfer protocols between interconnect 106 and computer network 170 and can be, for example, a modem or ethernet circuitry.

Briefly, player 110 receives musical tracks 112 and associated data through computer network 170 in a manner described more completely in U.S. patent application Ser. No. 09/020,025 filed Feb. 6, 1998 entitled "Secure Online Music Distribution System" by Philip R. Wiser, Andrew R. Cherenson, Steven T. Ansell, and Susan A. Canon which is incorporated herein in its entirety by reference. Accordingly, tracks 112 are stored in an encrypted format in which only player 110 can decrypt tracks 112 for playback of the substantive content of tracks 112. SPT interface 114 creates secure portable tracks (SPTs) 116 from tracks 112 and downloads SPTs 116 to portable player 150. While the substantive content of tracks 112 and SPTs 116 is described in this illustrative embodiment as music, it is appreciated that many of the techniques and mechanisms described herein are equally applicable to other forms of data for which unauthorized copying is to be thwarted. Examples of such content includes, for example, still graphical images, motion video, and computer software.

In accordance with the present invention, SPTs 116 are bound both to storage medium 202 (FIG. 2) in which SPTs 116 are stored within portable player 150 and to one or more specific external players, e.g., portable player 150. For example, storage medium 202 is a removable digital storage medium such as a recordable compact disc (CD-R), a minidisc, a digital video disc (DVD), digital audio tape (DAT), flash memory card, or similar removable digital storage medium. In addition, portable player 150 can include sufficient storage to store a number of SPTs 116 which can be directly downloaded into portable player 150, obviating removable digital storage media such as storage medium 202. However, it is desirable to permit playback of content of SPTs 116 in less-portable external players such as high-quality component players of home stereo systems and dash-mounted players installed in cars and other vehicles. Accordingly, removable storage media such as storage medium 202 is preferred to storage directly within portable player 150. External players are playback devices which can operate while detached from computer system 100 (FIG. 1).

Binding SPTs 116 to storage medium 202 (FIG. 2) renders SPTs 116 unplayable when copied to a different storage medium. Similarly, binding SPTs 116 to a number of external players, including portable player 150, makes SPTs 116 unplayable in external players other than the external players to which SPTs 116 are bound. Accordingly, copying of SPTs 116 is inhibited.

Understanding the manner in which SPTs 116 are bound to storage medium 202 and portable player 150 is facilitated by a brief description of the format of SPTs 116. An illustrative one of SPTs 116 is shown in greater detail in FIG. 3. SPT 116 includes a header 302 which in turn includes a number of bindings as described more completely below and a reference to a table of contents 306. In one embodiment, table of contents 306 is the last component of SPT 116. In such an embodiment, table of contents 306 can be formed as images 304A–C are appended to SPT 116 during creation and can be appended to SPT 116 after all images are included in SPT 116 and table of contents 306 is complete. Each of images 304A–C are discrete components of SPT 116 and can have a different structure. Each image of SPT 116 is represented by and is accessible through one of descriptors 308A–D of table of contents 306. All images of SPT 116 collectively represent the substantive content of SPT 116, e.g., digitally represented music.

Header 302 includes a number of bindings 400 (FIG. 4), each of which binds the content of SPT 116 (FIG. 2) to both (i) storage medium 202 and (ii) a particular external player such as portable player 150. Each of bindings 400 includes the following fields, each of which stores data representing a component of the binding: (i) media identification field 402, (ii) media type and information field 404, (iii) storage key identification field 406, (iv) encrypted media master key 408, and (v) binding message authentication code (MAC) field 410.

Media identification field 402 stores data representing a read-only serial number 204 (FIG. 2) of storage medium 202. Serial number 204 is "read-only" in that alteration of the particular value of serial number 204 is difficult. For example, serial number 204 can be stored in a portion of storage medium 202 which cannot be overwritten or can be represented in semiconductor circuitry included in storage medium 202. It is appreciated that serial number 204 can never be completely protected from alteration by particularly industrious and persistent crackers. However, serial number 204 should not be alterable by straightforward data writing access to storage medium 202.

Figure 2:
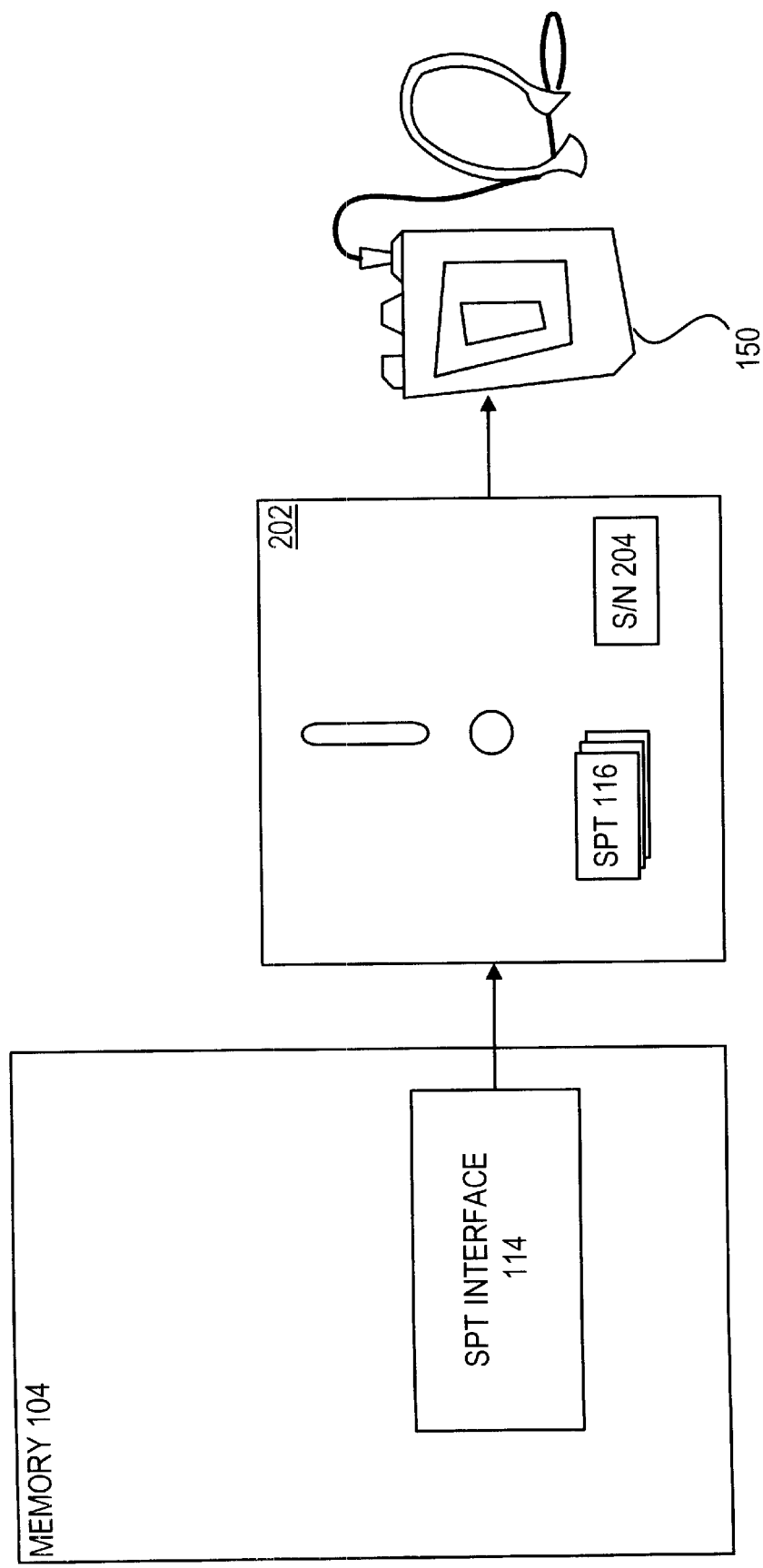
FIG. 2 is a block diagram of the interface and external player of FIG. 1 showing a storage medium for the secure portable track in greater detail.

Media type and information field 404 (FIG. 4) stores data representing the type of storage medium 202 (FIG. 2). Such permits comparison of the indicated type with the actual type of storage medium 202. For example, if media type and information field 404 (FIG. 4) indicates that storage medium 202 (FIG. 2) is a DVD and portable player 150 determines that storage medium 202 is a flash memory card, portable player 150 can readily reject storage medium 202 as an invalid copy.

Storage key identification field 406 stores data identifying the storage key, i.e., the key with which the master media key is encrypted. The master media key is the key with which the substantive content of SPT 116 is encrypted. To bind SPT 116 to a particular external player, e.g., portable player 150, the storage key is a key which is maintained in secrecy and is allocated to the specific external player. An example of such a storage key is read-only key 504A (FIG. 5) of portable player 150. Read-only key 504A is analogous to serial number 204 (FIG. 2) of storage medium 202 in that read-only key 504A is difficult to change, typically requiring physical deconstruction of portable player 150. For example, read-only key 504A can be embedded in the internal semiconductor circuitry of portably player 150. In one embodiment, read-only key 504A includes three (3) separate keys: one which is never shared with other external players, one which can be shared with other external players, and one which is common to all external players. By selecting a specific one of these keys as the storage key, player 110 and SPT interface 114 can select a desired level of security of the substantive content of SPT 116.

Storage key identification field 406 (FIG. 4) stores a digest of the storage key to identify the storage key without recording the storage key itself within SPT 116.

Encrypted media master key field 408 (FIG. 4) stores data representing an encrypted representation of the key by which the content of SPT 116 (FIG. 3), e.g., images 304A–C, is encrypted. The media master key is encrypted to prevent unauthorized decryption of the content of SPT 116.

Binding MAC field 410 (FIG. 4) stores data representing a message authentication code (MAC) of fields 402–408 and therefore provides protection against tampering with the contents of field 402–408 by a cracker attempting to gain unauthorized access to the content of SPT 116. MACs are conventional and known and are not described further herein.

Logic flow diagram 600 (FIG. 6) illustrates the preparation of SPT 116 (FIG. 1) from one or more of tracks 110 by player 110 through SPT interface 114 for playback by portable player 150. In step 602 (FIG. 6), player 110 (FIG. 1) encrypts the content of one or more of tracks 110 using, for example, symmetric key encryption. Symmetric key encryption of the content is used in this illustrative embodiment to facilitate decryption by portable player 150 with sufficient efficiency to permit uninterrupted playback of CD-quality music while simultaneously leaving sufficient processing resources within portable player 150 for decompression of compressed audio data and permitting use of relatively inexpensive components within portable player 150 with limited processing power to thereby minimize the cost of portable player 150 to consumers.

The master media key is encrypted using the storage key of the particular external player to which SPT 116 is to be bound. To avoid divulging the storage key to player 110, the particular external player, rather than player 110, encrypts the master media key. Thus, in step 604 (FIG. 6), player 110 (FIG. 1) encrypts the media master key using a session key formed at the onset of a secure communication session between player 110 and portable player 150 and sends the encrypted master media key to portable player 150. Portable player 150 decrypts the master media key and re-encrypts the master media key using the storage key, e.g., read-only key 504A and sends the encrypted master media key back to player 110. As a result, only portable player can decrypt the encrypted master media key and therefore the content of SPT 116. Preparation of multiple bindings is described below in greater detail. Session keys are formed using a communication key of portable player 150 which, like read-only key 504A, is difficult to change and which is held in secrecy by portable player 150. However, for the purposes of carrying out secure communication, portable player 150 communicates the communication key to player 110 during a one-time registration which is described more completely below. The use of a communication separate from the storage key serves to protect the secrecy of the storage key.

Since the master media key is encrypted using read-only key 504A, the master media key—and therefore the content of SPT 116 which is encrypted with the master media key—can only be decrypted using read-only key 504A. By carefully guarding the secrecy of read-only key 504A, SPT 116 is bound to portable player 150 and can only be played back by portable player 150 or by any external player with which portable player has shared keys. A mechanism by which external players can share read-only keys in a secure manner is described below in greater detail.

In step 606 (FIG. 6), player 110 (FIG. 1) forms a digest of the storage key, e.g., read-only key 504A (FIG. 5), to produce storage key identification data.

In step 608 (FIG. 6), player 110 (FIG. 1) forms SPT 116, stores the encrypted content in SPT 116, and forms binding 400 (FIG. 4) within header 302 of SPT 116. Player 110 (FIG. 1) forms binding 400 (FIG. 4) by (i) storing serial number 204 (FIG. 2) in media identification field 402 (FIG. 4), (ii) storing data representing the type of storage medium 202 (FIG. 2) in media type and information field 404 (FIG. 4), (iii), storing the digest formed in step 606 (FIG. 6) in storage key identification field 406 (FIG. 4), (iv) storing the encrypted media master key formed in step 604 (FIG. 6) in encrypted media master key field 408 (FIG. 4), and (v) forming and storing in binding MAC field 410 (FIG. 4) a MAC of fields 402–408.

Player 110 (FIG. 1) can bind SPT 116 to multiple external players by forming a separate binding 400 for each such external player. For each such binding, player 110 repeats steps 604–606 and step 608 except that the encrypted content is included in SPT 116 only once. Thus, there is only one media master key by which the content is encrypted but each of bindings 400 stores a different encryption of media master key.

Figure 7:
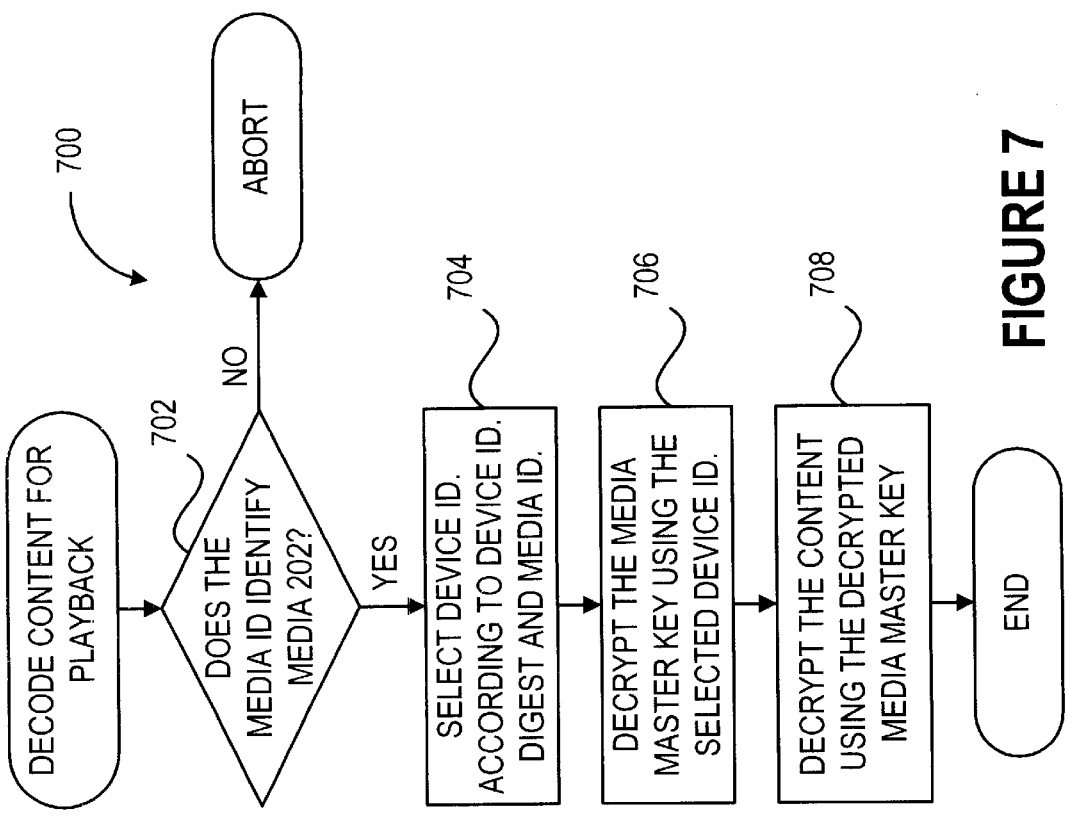
FIG. 7 is a logic flow diagram of the decoding of content to enforce a binding of the content to an external player and medium in accordance with the present invention.

The security afforded by such binding is more fully appreciated in the context of decoding for playback by portable player 150 as illustrated by logic flow diagram 700 (FIG. 7). In the context of logic flow diagram 700, storage media 202 (FIG. 5) is installed in portable player 150 such that SPTs 116 are accessible to portable player 150. Portable player 150 includes player logic 502A which includes circuitry and/or computer software to implement the functions performed by portable player 150. To playback a selected one of SPTs 116, player logic 502A reads SPT 116 and parses header 302 (FIG. 3) therefrom and parses bindings 400 (FIG. 4) from header 302.

In test step 702 (FIG. 7), player logic 502A (FIG. 5) retrieves read-only serial number 204 from storage media 202 and media identification data from media identification field 402 (FIG. 4) and compares read-only serial number 204 to the media identification data. If read-only serial number 204 and the media identification data are not equivalent, player logic 502A (FIG. 5) aborts playback of SPT 116. Accordingly, simple copying of SPT 116 from storage medium 202 to another storage media renders SPT 116 unplayable. If read-only serial number 204 and the media identification data are equivalent, processing transfers to step 704.

Figure 4:
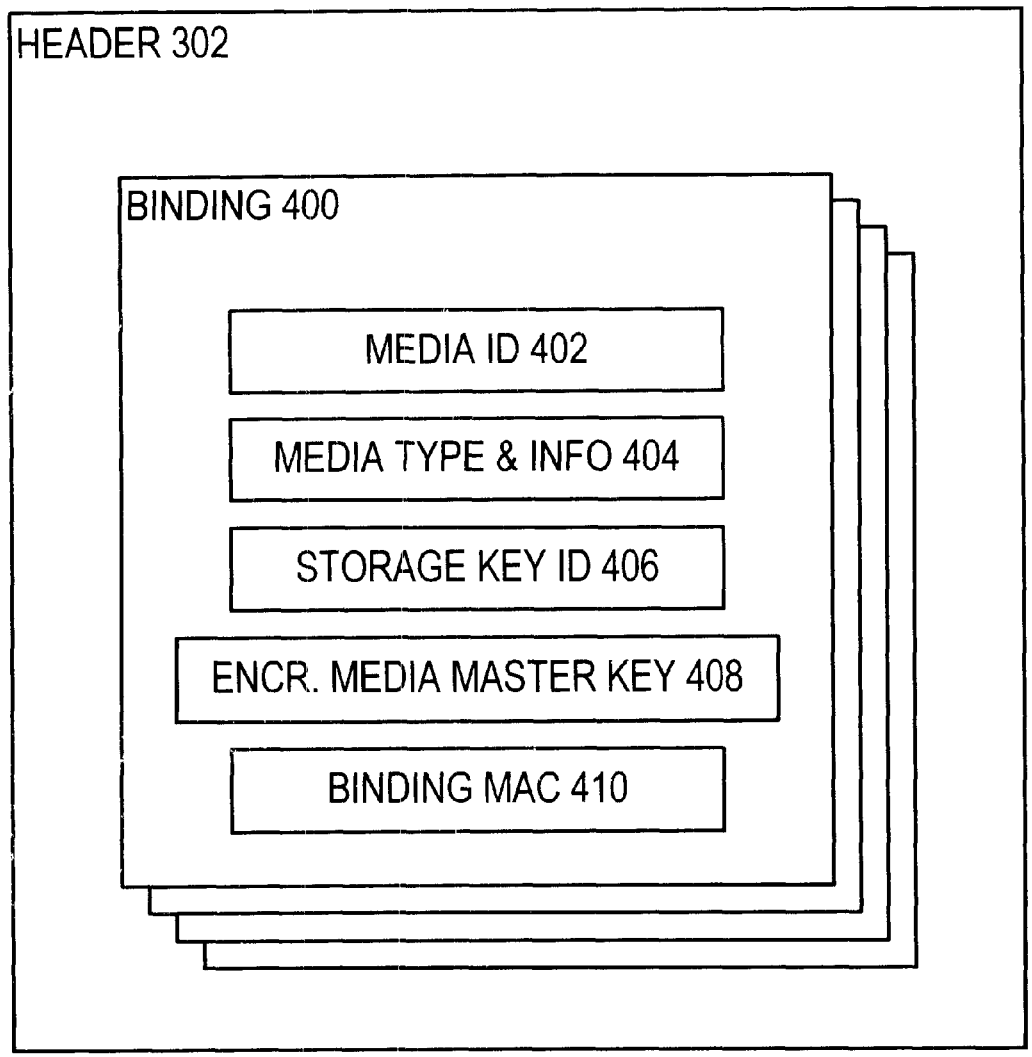
FIG. 4 is a block diagram illustrating bindings in the header of the secure portable track of FIG. 3 in accordance with the present invention.

In step 704 (FIG. 7), player logic 502A (FIG. 5) selects either read-only key 504A or a selected one of keys 506A1–4 according to the digest stored in storage key field 406 (FIG. 4). As described more completely below, portable player 150 can share keys with other external players. Keys 506A1–4 store read-only keys shared by other external players. The sharing of keys permits a single user to play content on a number of external players, e.g., a home player, a portable player, a player in a car, and a player at the office. In addition, read-only key 504A can include a number of individual component keys in one embodiment. Each such component key is considered by player logic 502A as a separate key in step 702 (FIG. 7).

To select the appropriate key, player logic 502A forms respective digests of each component key of read-only key 504A and each of keys 506A1–4 using the same algorithm employed by player 110 (FIG. 1) in step 606 (FIG. 6) and selects the one of keys 504A, 506A1–4 whose digest is accurately represented in storage key identification field 406 (FIG. 4). If no digest is accurately represented in storage key field 406 (FIG. 4), player logic 502A aborts playback and presents an error message to the user. Failure of the respective digests to be accurately represented in storage key field 406 indicates that portable player 150 (FIG. 5) does not include the storage key used by player 110 (FIG. 1) in step 604 (FIG. 6). Accordingly, recovery of the master media key and therefore the content of SPT 116 is not possible.

In step 706 (FIG. 7), player logic 502A (FIG. 5) decrypts the media master key from encrypted media master key field 408 (FIG. 4) using the key selected in step 704 (FIG. 7). In step 708, player logic 502A (FIG. 5) decrypts the content of SPT 116 using the decrypted media master key. After step 708, the content of SPT 116 is un-encrypted and is available for decompression and playback by player logic 502A. Decompression and playback of the unencrypted content is conventional.

Key Sharing

Frequently, a user will have multiple external players—e.g., a portable player such as portable player 150, a full-featured player as a component of a home stereo system, a dash-mounted player in a car, and perhaps a player at the user's place of work. Typically, the user would like to play a particular purchased track, e.g., SPT 116, on all of her external players. Since SPT 116 is bound to portable player 150 according to read-only key 504A, any external player with a copy of read-only key 504A can also play SPT 116. Therefore, to play SPT 116 on multiple external players, each such external player must have exchanged keys, either directly or indirectly, with portable player 150.

Figure 5:
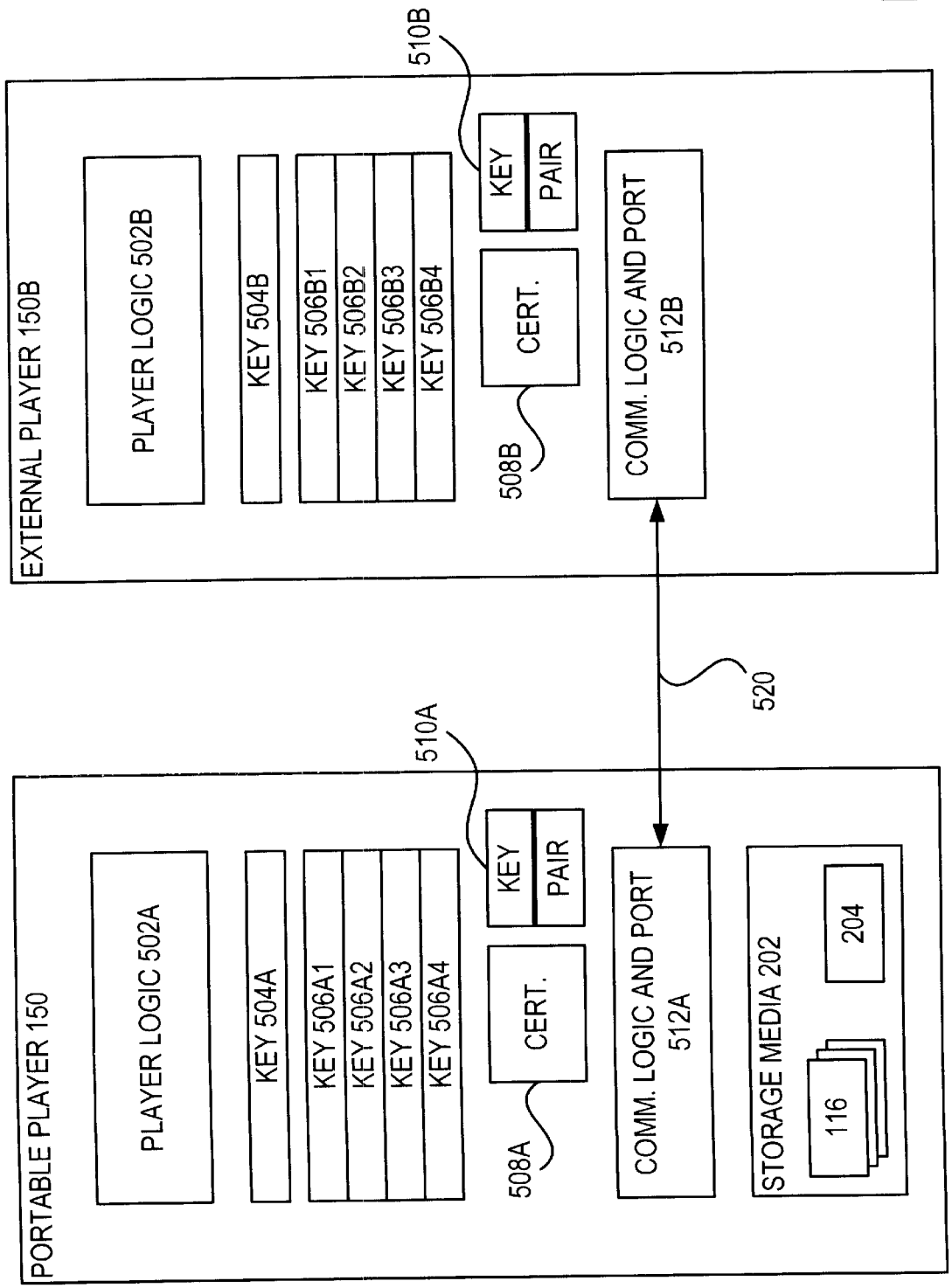
FIG. 5 is a block diagram of two external players in accordance with the present invention in greater detail.
Figure 6:
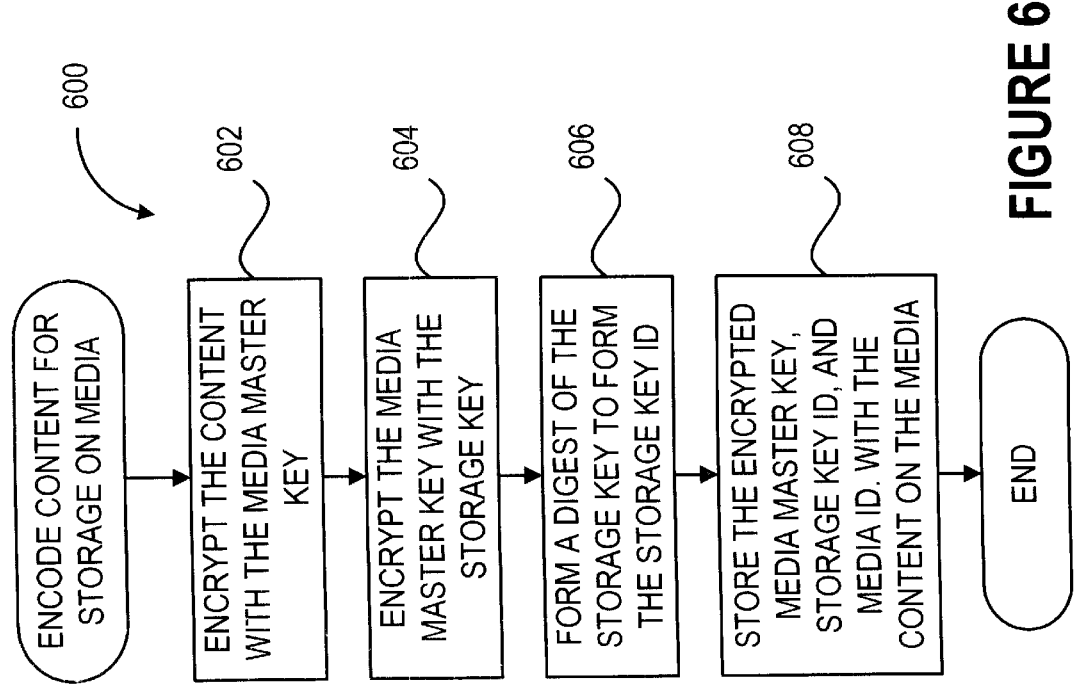
FIG. 6 is a logic flow diagram of the encoding of content to bind the content to an external player and medium in accordance with the present invention.

In addition to portable player 150, FIG. 5 shows a second external player 150B. External player 150B can be any of the various types of external players described above, including a second portable player. The components of portable player 150 and external player 150B are analogous to one another as shown in FIG. 5. Communication logic and ports 512A–B include hardware and software to communicate with other devices such as I/O port 140 and/or other external players. In one embodiment, communication logic and ports (CLPs) 512A–B are coupled directly to one another through a connector 520 and communicate directly with one another. Connector 502 can be, for example, a cable between communication logic and ports 512A–B. Alternatively, connector 502 can be light signals between communication logic and ports 512A–B which can include infrared LEDs and infrared light sensors. In an alternative embodiment, communication logic and ports 512A–B communicate only with an I/O port of a computer such as I/O port 140 of computer system 100. In the latter embodiment, computer system 100 includes at least two I/O ports such as I/O port 140 and both external players are coupled to computer system 100 such that SPT interface 114 acts as an intermediary to act as connector 520 between the external players. In an alternative variation of this latter embodiment, computer system 100 can have only a single I/O port 140 and SPT interface can act as a surrogate, exchanging keys with a single external player at a time and acting as a key repository. In this last embodiment, it is important that the keys stored within SPT interface 114 be stored in an encrypted form to prevent passing of the device keys to an unlimited number of external players. Such would be a serious compromise of the copy protection provided, relying more completely media binding for copy protection.

Logic flow diagram 800 (FIG. 8) illustrates a key exchange conducted between portable player 150 and external player 150B. In the embodiment in which SPT interface 140 (FIG. 1) acts as a surrogate external player and a key repository, SPT 140 performs a separate key exchange with each of portable player 150 and external player 150B in the manner described. The key exchange of logic flow diagram 800 (FIG. 8) is initiated by either of portable player 150 and external player 150B, perhaps in response . In this illustrative embodiment, portable player 150 initiates the key exchange.

In step 802 (FIG. 8), CLP 512A initiates the key exchange by sending a key exchange request message which includes certificate 508A of portable player 150 and a first random number. The first random number is included to add variety to session encryption keys in a known and conventional manner to frustrate attempts of malicious and ill-tempered computer processes to masquerade as either of players 150 and 150B having eavesdropped upon the dialogue between players 150 and 150B in hopes of gaining unauthorized access to read-only keys 504A and/or 504B. Certificates are known and are not described further herein except to note that certificate 508A can be used to authenticate portable player 150 and conveys the public key of key pair 510A of portable player 150. Similarly, certificate 508B can be used to authenticate external player 150B and conveys the public key of key pair 510B of external player 150B. Public/private key encryption/decryption is well-known and is not described further herein.

Figure 8A:
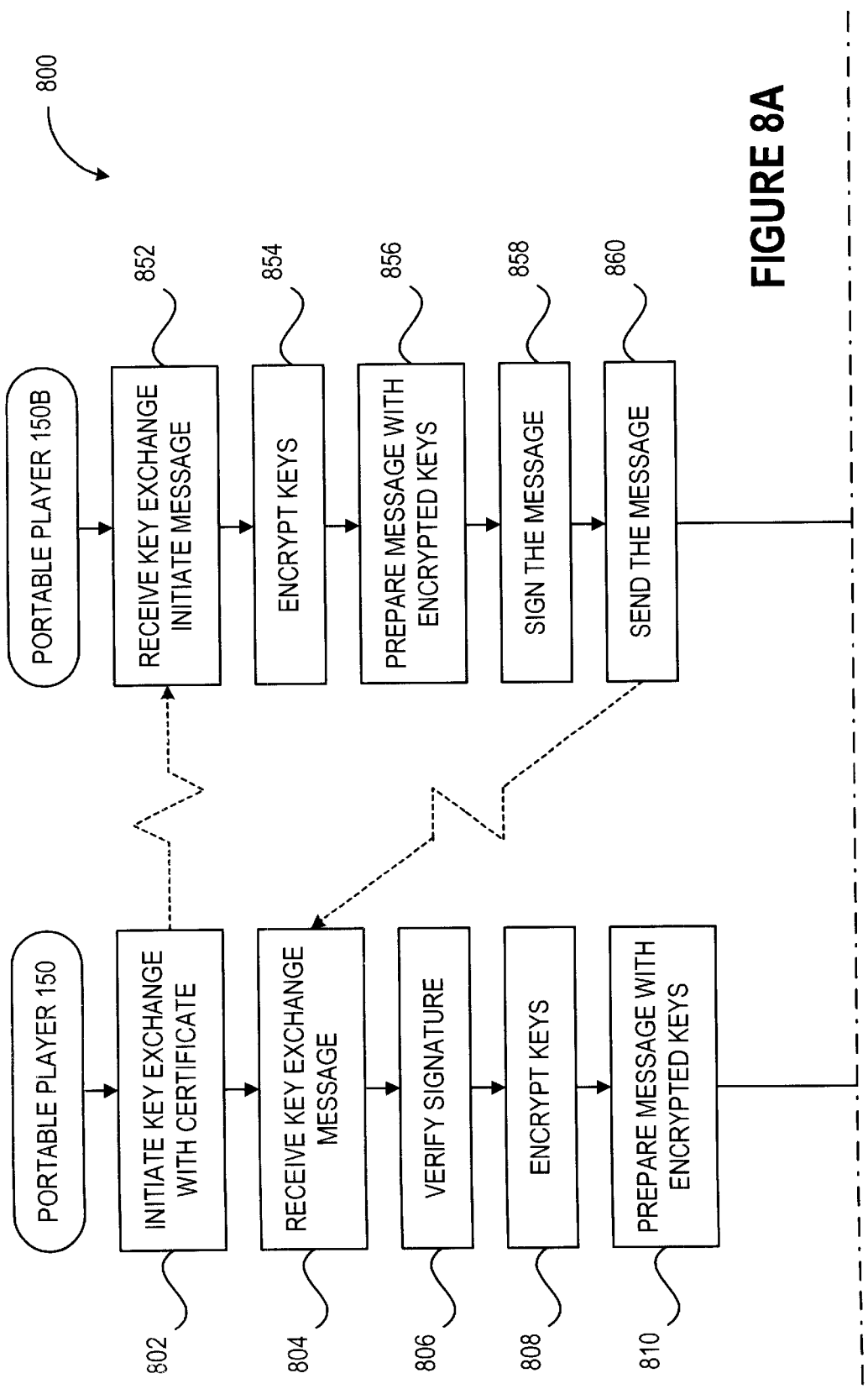
FIG. 8 is a logic flow diagram of the exchange of keys between the two external players shown in FIG. 5 in accordance with the present invention.

The key exchange initiate message is received by CLP 512B in step 852 (FIG. 8). In step 854, CLP 512B (FIG. 5) encrypts read-only key 504B and any of keys 506B1–4 which have been acquired through previous key exchanges. In the embodiment in which read-only keys 504A–B include multiple individual keys, CLP 512B includes only those keys of read-only key 504B to which portable player 150 is permitted access. CLP 512B encrypts the keys using the public key of portable player 150 parsed from the certificate in the key exchange initiate message. Accordingly, the keys can only be decrypted by CLP 512A. CLP 512B prepares a reply message in step 856 (FIG. 8). The reply message includes the encrypted keys, the first random number, a second random number, and certificate 508B (FIG. 5). The second random number adds to the variety of session keys to further frustrate attempts to gain information through eavesdropping upon the dialogue between players 150 and 150B. In step 858 (FIG. 8), CLP 512B (FIG. 5) cryptographically signs the reply message using the public key of key pair 510B and adds the signature to the reply message.

In step 860 (FIG. 8), CLP 512B sends the reply message to CLP 512A which receives the reply message in step 804 (FIG. 8). In step 806, CLP 512A (FIG. 5) verifies the signature of the reply message using the public key of key pair 510B from certificate 508B. CLP 512A encrypts read-only key 504A and any of keys 506A1–4 which have been acquired through previous key exchanges in step 808 (FIG. 8). In the embodiment in which read-only keys 504AB include multiple individual keys, CLP 512A includes only those keys of read-only key 504A to which external player 150B is permitted access. CLP 512A (FIG. 5) encrypts the keys using the public key of external player 150B parsed from the certificate in the reply message. Accordingly, the keys can only be decrypted by CLP 512B. CLP 512A prepares an exchange message in step 810 (FIG. 8). The exchange message includes the encrypted keys, the first random number, and the second random number. In step 812 (FIG. 8), CLP 512A (FIG. 5) cryptographically signs the exchange message using the public key of key pair 510A and adds the signature to the exchange message.

In step 814 (FIG. 8), CLP 512A sends the exchange message to CLP 512B which is received by CLP 512B in step 862 (FIG. 8). In step 864, CLP 512B (FIG. 5) verifies the signature of the exchange message using the public key of key pair 510A. The signatures of the reply and exchange messages serve to further cross-authenticate portable player 150 and external player 150B.

To terminate the transaction, CLP 512B sends a terminate message in step 866 (FIG. 8) which, in step 816, is received by CLP 512A (FIG. 5). Steps 868 (FIG. 8) and 870 are directly analogous to steps 818 and 820, respectively. Accordingly, the following description of steps 818 and 820 is equally applicable to steps 868 and 870, respectively.

In step 818, CLP 512A (FIG. 5) decrypts the encrypted keys using the private key of key pair 510A. At this point, portable player 150 has all the keys of external player 150B. In step 820 (FIG. 8), portable player 150 stores the decrypted keys in previously unused ones of keys 506A1–4, discarding decrypted keys already represented in keys 506A1–4 and discarding keys when all of keys 506A1–4 are used. While only four keys 506A1–4 are shown for simplicity, more keys can be included in portable player 150, e.g., 256 or 1,024 keys.

Thus, as shown in logic flow diagram 800 (FIG. 8), portable player 150 and external player 150B exchange keys such that any SPT, e.g., SPT 116, bound to either of portable player 150 and external player 150B can be played by the other. Such only requires a one-time key exchange when a new external player is acquired by a particular user.

Enforcement of Restrictions on SPT 116

Tracks 112 can have restrictions placed upon them by player 110 (FIG. 1) and, indirectly, by a server from which player 110 acquires tracks 112. Any such restrictions are included in SPTs 116. Such restrictions are represented in header 302 which is shown in greater detail in FIG. 9. Header can include a number of restrictions 902, each of which includes a restriction type field 904, a restriction data field 906, and a restriction state 908.

Figure 3:
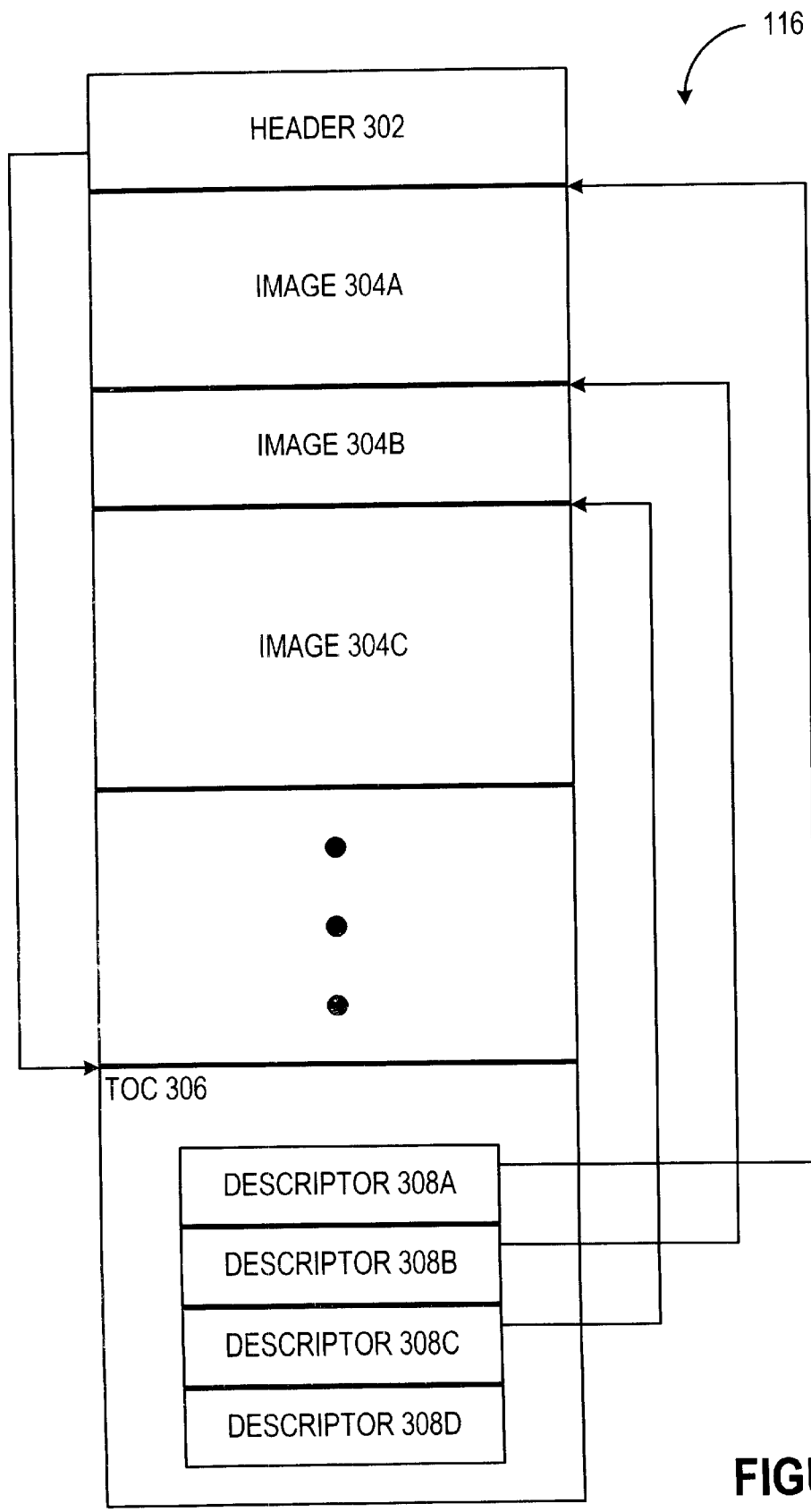
FIG. 3 is a block diagram of the format of a secure portable track in greater detail.

Restriction type field 904 stores data specifying a type of restriction on playback of SPT 116 (FIG. 3). Such restriction types can include, for example, the number of times SPT 116 can be played back, an expiration time beyond which SPT 116 cannot be played back, a number of storage media such as storage medium 202 (FIG. 2) on which SPT 116 can be fixed, and the number of devices to which SPT 116 can be bound.

Restriction data field 906 (FIG. 9) stores data specifying type-specific data to specify more particularly the restriction placed upon SPT 116. For example, if the restriction type is a number of times SPT 116 can be played back, restriction data field 906 specifies the number. If the restriction type is an expiration time beyond which SPT 116 cannot be played back, restriction data field 906 specifies the time. If the restriction type is a number of storage media such as storage medium 202 (FIG. 2) on which SPT 116 can be fixed, restriction data field 906 specifies the number. And, if the restriction type is a number of devices to which SPT 116 can be bound, restriction data field 906 specifies the number.

Restriction state field 908 (FIG. 9) stores data specifying the current state of the restriction. For example, if the restriction type is a number of times SPT 116 can be played back, restriction state field 908 stores the number of times SPT 116 has been played back to date. Restriction state 908 allows SPT 116 to be passed between a couple of external players which can both enforce restriction 902.

Figure 9:
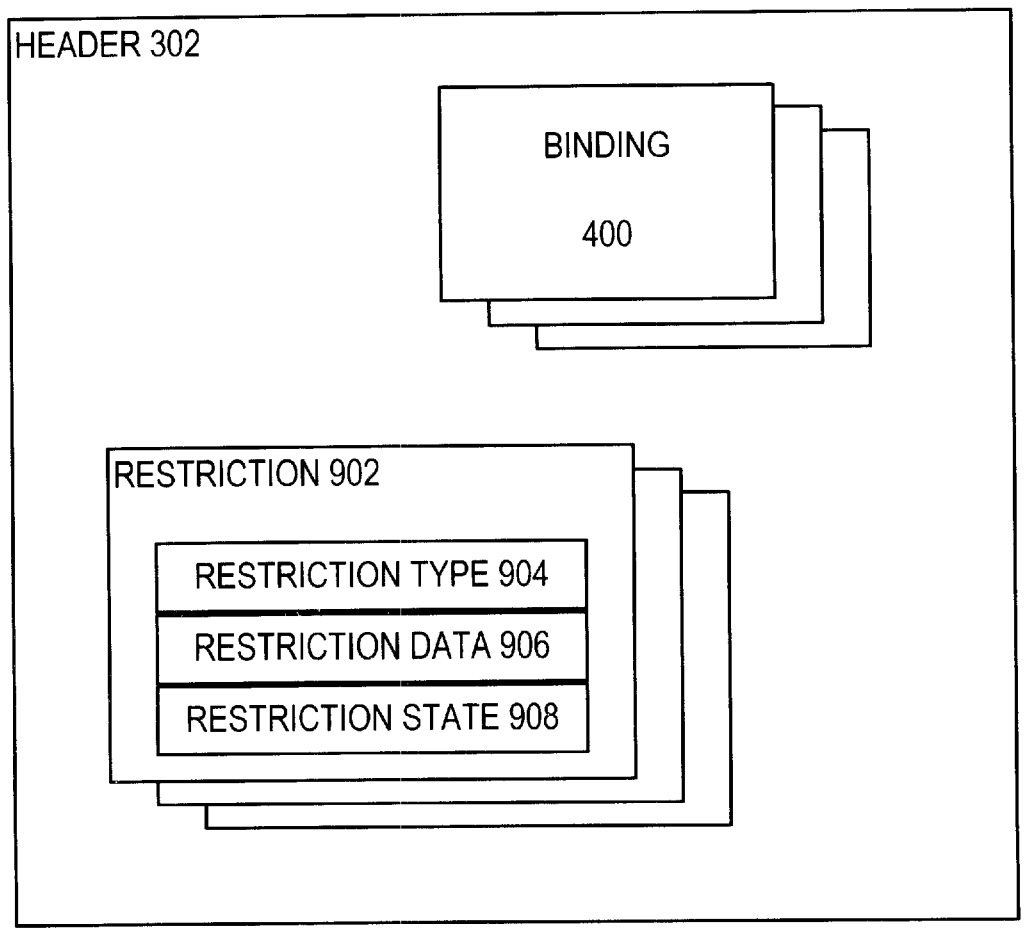
FIG. 9 is a block diagram illustrating restrictions in the header of the secure portable track of FIG. 3 in accordance with the present invention.

Player 110 (FIG. 1) and SPT interface 114 rely largely upon portable player 150, and player logic 502A (FIG. 5) in particular, for enforcement of restrictions 902 (FIG. 9).

Accordingly, SPT interface 114 (FIG. 9) requires assurance from portable player 150 than all restrictions can be enforced by portably player 150 as a precondition to downloading SPT 116 to portable player 150. Such downloading can include, for example, binding SPT 116 to portable player and copying SPT 116 as bound to a removable storage medium.

Figure 10:
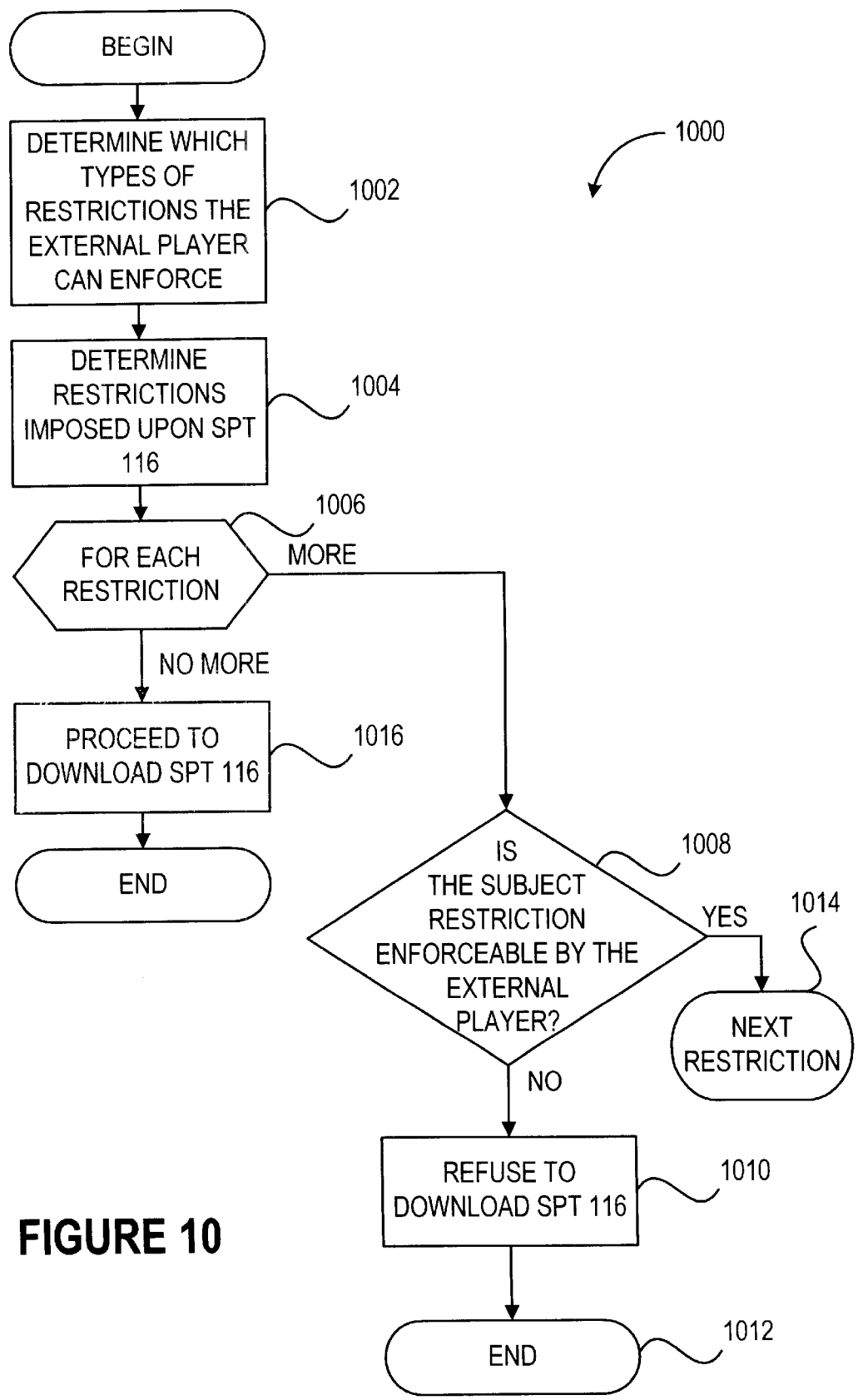
FIG. 10 is a logic flow diagram illustrating the assurance of an external player's ability to enforce restrictions in accordance with the present invention.

Logic flow diagram 1000 (FIG. 10) illustrates the conditional downloading of SPT 116 (FIG. 1) by SPT interface 114 contingent upon assurance by portable player 150 that restrictions 902 (FIG. 9) can be enforced by portable player 150. In step 1002 (FIG. 10), SPT interface 114 receives from portable player 150 a list of restriction types which can be enforced within portable player 150 during registration. Player 110 maintains this restriction enforceability information along with the communication key of player 110. Accordingly, step 1002 is performed only once for each external player while the following steps are performed as a precondition of downloading each SPT to an external player.

In step 1004 (FIG. 10), SPT interface 114 (FIG. 1) determines which restrictions are imposed upon SPT 116 by reference to restrictions 902 (FIG. 9). Loop step 1006 and next step 1014 define a loop in which each of restrictions 906 is processed according to steps 1008–1012. During each iteration of this loop, the particular one of restrictions 902 processed by SPT interface 114 is referred to as the subject restriction.

For each of restrictions 902, processing transfers to test step 1008 (FIG. 10) in which SPT interface 114 (FIG. 1) determines whether the subject restriction is of a type enforceable by portable player 150. If not, processing transfers to step 1010 (FIG. 10) in which SPT interface 114 refuses to download SPT 116 for portable player 150 and processing terminates in step 1012. Conversely, if the subject restriction is of a type enforceable by portable player 150, processing transfers through next step 1014 to loop step 1006 and the next of restrictions 902 (FIG. 9) is processed according to the loop of steps 1006–1014.

When all restrictions 902 (FIG. 9) have been processed in the loop of steps 1006–1014, SPT interface 114 has determined that portable player 150 can enforce all restrictions 902 and processing transfers to step 1016 in which SPT interface 114 proceeds with downloading SPT 116 for portable player 150. Thus, SPT interface 114 ensures that portable player 150 can enforce all restrictions placed upon SPT 116 prior to making SPT 116 available to portable player 150.

Smart Media

Figure 11:
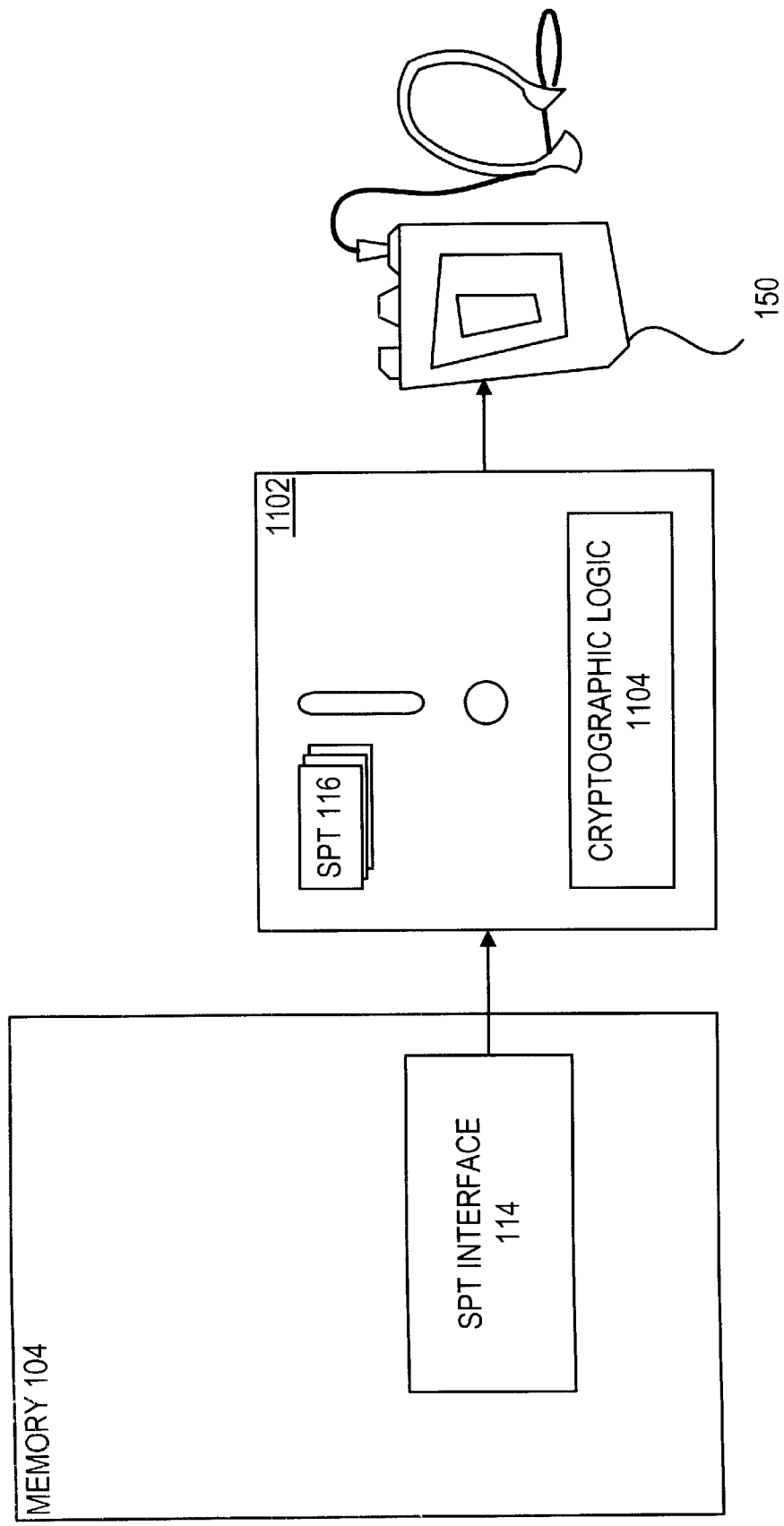
FIG. 11 is a block diagram of the interface and external player of FIG. 1 showing a storage medium for the secure portable track in greater detail.

In one embodiment, storage medium 202 (FIG. 2) is replaced with smart medium 1102 (FIG. 11). Smart medium 1102 replaces read-only serial number 204 (FIG. 2) with cryptographic logic 1104. Cryptographic logic 1104 is embedded in the packaging of smart medium 1102 in a manner which is analogous to the embedding of logic in any currently available smart card, e.g., a plastic card of the approximate dimensions of a credit card with embedded integrated circuitry. Cryptographic logic 1104 performs encryption and decryption using an encryption algorithm and key which are both kept entirely secret within cryptographic logic.

Logic flow diagram 1200 (FIG. 12) illustrates the preparation of SPT 116 (FIG. 1) from one or more of tracks 110 by SPT interface 114 for playback by portable player 150. In step 1202 (FIG. 12), SPT interface 114 (FIG. 1) encrypts the content of one or more of tracks 110 using, for example, symmetric key encryption.

In step 1204 (FIG. 12), SPT interface 114 (FIG. 11) sends the master media key to cryptographic logic 1104 for encryption. Cryptographic logic 1104 returns the master media key in an encrypted form. The particular manner in which the master media key is encrypted by cryptographic logic 1104 is not known by, and is of no concern to, SPT interface 114 so long as cryptographic logic 1104 can later decrypt the master media key.

Since the master media key is encrypted using cryptographic logic 1104, the master media key—and therefore the content of SPT 116 which is encrypted with the master media key—can only be decrypted using cryptographic logic 1104. By embedding cryptographic logic 1104 in the packaging of smart medium 1102 thereby carefully guarding the secrecy of cryptographic logic 1104, SPT 116 is bound to smart medium 1102 and can only be played back from smart medium 1102. SPT 116 cannot be played back from any other storage medium unless cryptographic logic 1104 is accurately replicated. Replication of such embedded logic is particularly difficult, especially for casual listeners of music.

In step 1206 (FIG. 12), SPT interface 114 (FIG. 11) forms SPT 116 and stores the encrypted content in SPT 116. SPT interface 114 stores the encrypted master media key in the header of SPT 116. SPT 116 is therefore bound to smart medium 1102.

The security afforded by such binding is more fully appreciated in the context of decoding for playback by portable player 150 as illustrated by logic flow diagram 1300 (FIG. 13). In the context of logic flow diagram 1300, storage media 1102 (FIG. 11) is installed in portable player 150 such that SPTs 116 are accessible to portable player 150. To playback a selected one of SPTs 116, player logic 502A (FIG. 5) reads SPT 116 and parses header 302 (FIG. 3) therefrom and parses the encrypted master media key from header 302 in step 1302 (FIG. 13).

In step 1304 (FIG. 13), player logic 502A (FIG. 5) sends the encrypted master media key to cryptographic logic 1104 (FIG. 11) for decryption. Cryptographic logic 1104 returns the master media key in an un-encrypted form. The particular manner in which the master media key is decrypted by cryptographic logic 1104 is not known by, and is of no concern to, player logic 502A (FIG. 5). Since player 110 (FIG. 1), SPT interface 114, and player 150 do not know the particular encryption/decryption algorithm implemented by cryptographic logic 1104 (FIG. 11), the secrecy of that algorithm is more easily protected.

In step 1306 (FIG. 13), player logic 502A (FIG. 5) decrypts the content of SPT 116 using the decrypted media master key. After step 1306 (FIG. 13), the content of SPT 116 is un-encrypted and is available for decompression and playback by player logic 502A. Decompression and playback of the un-encrypted content is conventional.

External Player Registration

As described above, player 110 (FIG. 1) requires device identification data such as read-only key 504A (FIG. 5) to bind SPTs 116 to a particular external player such as portable player 150. To register portable player 150 (FIG. 1), portable player 150 communicates with player 110, e.g., through I/O port 140 and SPT interface 114. Portable player 150 can be coupled to I/O port 140 using a convenient cradle such as those used in conjunction with currently available portable MP3 players and with the Palm series of personal digital assistants (PDAs) available from 3Com Corp. of Santa Clara, Calif. For external players which are somewhat less portable, e.g., components of a home stereo system, CLP 512A (FIG. 5), certificate 508A, key pair 510A, and keys 504A and 506A1–4 can be included on a smart card such as those used in conjunction with currently available digital satellite system (DSS) receivers. Such smart cards can be inserted into a reader coupled to I/O port 140 (FIG. 1) to carry out registration and key exchange and re-inserted in the stereo system component external player for playback of SPTs 116. Dash-mounted external players in a car can include CLP 512A (FIG. 5), certificate 508A, key pair 510A, and keys 504A and 506A1–4 in a detachable face plate such as those commonly used for theft deterrence. The detachable face plate can be coupled to I/O port 140 (FIG. 1) through a cradle similar to those described above except that the form of the cradle fits the detachable face and include electrical contacts to meet contacts included in the detachable face plate.

Once portable player 150 is in communication with SPT interface 114, and therethrough with player 110, portable player 150 and player 110 conduct a key exchange in the manner described above. As a result, player 110 has a copy of read-only key 504A (FIG. 5) and can bind SPTs 116 to portable player 150. To allow the user of portable player 150 to acquire music products at locations other than computer system 100 (FIG. 1), player 100 can upload read-only key 504A to a server computer system through computer network 170 in a cryptographically secure manner. In an embodiment in which computer network 170 is the Internet, the user can purchase content at any of a great multitude of computer systems all over the world and, in addition, at specially designated kiosks at various retail locations. Upon proper authentication of the user at any such site, the user can purchase and encode SPTs 116 for portable player 150 and, indirectly, for any external player with which portable player 150 has exchanged keys.

The above description is illustrative only and is not limiting. The present invention is limited only by the claims which follow.

What is claimed is:

1. A method for binding subject data to a selected data access device such that the subject data is inaccessible to data access devices other than the selected data access device, the method comprising:

encrypting the subject data to form encrypted subject data using data corresponding to the selected data access device as an encryption key;

forming key identification data from the encryption key; and storing the encrypted subject data and the key identification data in a storage medium which is readable by the selected data access device;

wherein the encryption key is not directly determinable from data stored on the storage medium including the key identification data and the encrypted subject data.

2. The method of claim 1 wherein encrypting the subject data comprises:

encrypting the subject data using a master key; and encrypting the master key with the encryption key to form an encrypted master key.

3. The method of claim 2 wherein storing the encrypted subject data and the key identification data further comprises:

storing the encrypted master key in the storage medium.

4. The method of claim 3 further comprising:

forming message verification data using the key identification data and the encrypted master key; and storing the message verification data in the storage medium.

5. The method of claim 4 wherein the message verification data is a message authentication code (MAC).

6. The method of claim 1 further comprising:

forming message verification data using the key identification data; and storing the message verification data in the storage medium.

7. The method of claim 6 wherein the message verification data is a message authentication code (MAC).

8. The method of claim 1 wherein the subject data includes digitized audio signals.

9. The method of claim 1 wherein the data secretly held by the selected data access device is read-only.

10. A method for accessing subject data from a storage medium by a selected data access device, the method comprising:

retrieving key identification data from the storage medium;

determining that the key identification data corresponds to data secretly held by the selected data access device;

retrieving encrypted subject data from the storage medium; and decrypting the encrypted subject data using the data secretly held by the selected data access device as an encryption key to form the subject data wherein the key identification data is formed from the encryption key; and wherein the encryption key is not directly determinable from data stored on the storage medium including the key identification data and the encrypted subject data.

11. The method of claim 10 wherein the storage medium is a removable storage medium.

12. The method of claim 10 wherein decrypting comprises:

retrieving an encrypted master key from the storage medium;

decrypting the encrypted master key using the data secretly held by the selected data access device as an encryption key to form a master key; and decrypting the encrypted subject data using the master key to form the subject data.

13. The method of claim 10 further comprising:

retrieving message verification data from the storage medium; and verifying authenticity of the key identification data using the message verification data.

14. The method of claim 13 wherein the message verification data is a message authentication code (MAC).

15. The method of claim 10 wherein the subject data includes digitized audio signals.

16. The method of claim 15 further comprising:

playing back the digitized audio signals.

17. The method of claim 10 wherein the subject data includes digitized video signals.

18. The method of claim 17 further comprising:

rendering the digitized video signals.

19. The method of claim 10 wherein the subject data includes computer code.

20. The method of claim 19 further comprising:

executing the computer code.

21. A method for accessing subject data from a storage medium by a selected data access device, the method comprising:

receiving key data corresponding to a second data access device from the second data access device;

retrieving key identification data from the storage medium;

determining that the key identification data corresponds to the key data received from the second data access device;

retrieving encrypted subject data from the storage medium; and decrypting the encrypted subject data using the key data received from the second data access device as an encryption key to form the subject data.

22. The method of claim 21 wherein the storage medium is a removable storage medium.

23. The method of claim 21 wherein decrypting comprises:

retrieving an encrypted master key from the storage medium;

decrypting the encrypted master key using the data secretly held by the selected data access device as an encryption key to form a master key; and decrypting the encrypted subject data using the master key to form the subject data.

24. The method of claim 21 wherein receiving key data corresponding to a second data access device comprises:

sending a request message to the second data access device requesting key data from the second data access device;

receiving a reply message from the second data access device which includes encrypted key data;

decrypting the encrypted key data to form the key data.

25. The method of claim 24 wherein receiving key data corresponding to a second data access device further comprises:

sending an exchange message to the second data access device where the exchange message includes encrypted key data corresponding to the selected data access device.

26. The method of claim 24 wherein receiving key data corresponding to a second data access device further comprises:

receiving a terminate message from the second data access device.

27. The method of claim 24 wherein receiving key data corresponding to a second data access device further comprises:

preventing storage of the key data within the selected data access device upon a condition in which equivalent key data is already stored within the selected data access device.

28. The method of claim 24 wherein the request message includes a pseudo-random number.

29. The method of claim 28 wherein the reply message include the first-mentioned pseudo-random number and a second pseudo-random number.

30. The method of claim 24 wherein the request message includes a certificate of the selected data access device.

31. The method of claim 24 wherein the request message conveys a public key of the selected data access device to the second data access device.

32. The method of claim 31 wherein decrypting the encrypted key data comprises:

decrypting the encrypted key data using the private key of the selected data access device to form the key data.

33. The method of claim 21 wherein receiving key data corresponding to a second data access device comprises:

receiving a request message from the second data access device requesting key data from the selected data access device;

sending a reply message to the second data access device which includes encrypted key data;

receiving an exchange message from the second data access device which includes other encrypted key data; and decrypting the other encrypted key data to form the key data.

34. The method of claim 21 wherein the encryption key is not directly determinable from data stored on the storage medium including the key identification data and the encrypted subject data.

35. A computer readable medium useful in association with a computer which includes a processor and a memory, the computer readable medium including computer instructions which are configured to cause the computer to bind subject data to a selected data access device such that the subject data is inaccessible to data access devices other than the selected data access device by:

encrypting the subject data to form encrypted subject data using data corresponding to the selected data access device as an encryption key;

forming key identification data from the encryption key; and storing the encrypted subject data and the key identification data in a storage medium which is readable by the selected data access device;

wherein the encryption key is not directly determinable from data stored on the storage medium including the key identification data and the encrypted subject data.

36. The computer readable medium of claim 35 wherein encrypting the subject data comprises:

encrypting the subject data using a master key; and encrypting the master key with the encryption key to form an encrypted master key.

37. The computer readable medium of claim 36 wherein storing the encrypted subject data and the key identification data further comprises:

storing the encrypted master key in the storage medium.

38. The computer readable medium of claim 37 wherein the computer instructions are configured to cause the computer to bind subject data to a selected data access device such that the subject data is inaccessible to data access devices other than the selected data access device by also:

forming message verification data using the key identification data and the encrypted master key; and storing the message verification data in the storage medium.

39. The computer readable medium of claim 38 wherein the message verification data is a message authentication code (MAC).

40. The computer readable medium of claim 35 wherein the computer instructions are configured to cause the computer to bind subject data to a selected data access device such that the subject data is inaccessible to data access devices other than the selected data access device by also:

forming message verification data using the key identification data; and storing the message verification data in the storage medium.

41. The computer readable medium of claim 40 wherein the message verification data is a message authentication code (MAC).

42. The computer readable medium of claim 35 wherein the subject data includes digitized audio signals.

43. The computer readable medium of claim 35 wherein the data secretly held by the selected data access device is read-only.

44. A computer readable medium useful in association with a computer which includes a processor and a memory, the computer readable medium including computer instructions which are configured to cause the computer to access subject data from a storage medium by a selected data access device by:

retrieving key identification data from the storage medium;

determining that the key identification data corresponds to data secretly held by the selected data access device;

retrieving encrypted subject data from the storage medium; and decrypting the encrypted subject data using the data secretly held by the selected data access device as an encryption key to form the subject data;

wherein the key identification data is formed from the encryption key; and wherein the encryption key is not directly determinable from data stored on the storage medium including the key identification data and the encrypted subject data.

45. The computer readable medium of claim 44 wherein the storage medium is a removable storage medium.

46. The computer readable medium of claim 44 wherein decrypting comprises:

retrieving an encrypted master key from the storage medium;

decrypting the encrypted master key using the data secretly held bay the selected data access device as an encryption key to form a master key; and decrypting the encrypted subject data using the master key to from the subject data.

47. The computer readable medium of claim 44 wherein the computer instructions are configured to cause the computer to access subject data from a storage medium by a selected data access device by also:

retrieving message verification data from the storage medium; and verifying authenticity of the key identification data using the message verification data.

48. The computer readable medium of claim 47 wherein the message verification data is a message authentication code (MAC).

49. The computer readable medium of claim 44 wherein the subject data includes digitized audio signals.

50. The computer readable medium of claim 49 wherein the computer instructions are configured to cause the computer to access subject data from a storage medium by a selected data access device by also:

playing back the digitized audio signals.

51. The computer readable medium of claim 44 wherein the subject data includes digitized video signals.

52. The computer readable medium of claim 51 wherein the computer instructions are configured to cause the computer to access subject data from a storage medium by a selected data access device by also:

rendering the digitized video signals.

53. The computer readable medium of claim 44 wherein the subject data includes computer code.

54. The computer readable medium of claim 53 wherein the computer instructions are configured to cause the computer to access subject data from a storage medium by a selected data access device by also:

executing the computer code.

55. A computer readable medium useful in association with a computer which includes a processor and a memory, the computer readable medium including computer instructions which are configured to cause the computer to access subject data from a storage medium by a selected data access device by:

receiving key data corresponding to a second data access device from the second data access device;

retrieving key identification data from the storage medium;

determining that the key identification data corresponds to the key data received from the second data access device;

retrieving encrypted subject data from the storage medium; and decrypting the encrypted subject data using the key data received from the second data access device as an encryption key to form the subject data.

56. The computer readable medium of claim 55 wherein the storage medium is a removable storage medium.

57. The computer readable medium of claim 55 wherein decrypting comprises:
 retrieving an encrypted master key from the storage medium;
 decrypting the encrypted master key using the data secretly held by the selected data access device as an encryption key to form a master key; and
 decrypting the encrypted subject data using the master key to form the subject data.

58. The computer readable medium of claim 55 wherein receiving key data corresponding to a second data access device comprises:
 sending a request message to the second data access device requesting key data from the second data access device;
 receiving a reply message from the second data access device which includes encrypted key data;
 decrypting the encrypted key data to form the key data.

59. The computer readable medium of claim 58 wherein receiving key data corresponding to a second data access device further comprises:
 sending an exchange message to the second data access device where the exchange message includes encrypted key data corresponding to the selected data access device.

60. The computer readable medium of claim 58 wherein receiving key data corresponding to a second data access device further comprises:
 receiving a terminate message from the second data access device.

61. The computer readable medium of claim 58 wherein receiving key data corresponding to a second data access device further comprises:
 preventing storage of the key data within the selected data access device upon a condition in which equivalent key data is already stored within the selected data access device.

62. The computer readable medium of claim 58 wherein the request message includes a pseudo-random number.

63. The computer readable medium of claim 62 wherein the reply message include the first-mentioned pseudo-random number and a second pseudo-random number.

64. The computer readable medium of claim 58 wherein the request message includes a certificate of the selected data access device.

65. The computer readable medium of claim 58 wherein the request message conveys a public key of the selected data access device to the second data access device.

66. The computer readable medium of claim 65 wherein decrypting the encrypted key data comprises:
 decrypting the encrypted key data using the private key of the selected data access device to form the key data.

67. The computer readable medium of claim 55 wherein receiving key data corresponding to a second data access device comprises:
 receiving a request message from the second data access device requesting key data from the selected data access device;
 sending a reply message to the second data access device which includes encrypted key data;
 receiving an exchange message from the second data access device which includes other encrypted key data; and
 decrypting the other encrypted key data to form the key data.

68. The computer readable medium of claim 55 wherein the encryption key is not directly determinable from data stored on the storage medium including the key identification data and the encrypted subject data.

69. A computer system comprising:
 a processor;
 a memory operatively coupled to the processor; and
 a binding module (i) which executes in the processor from the memory and (ii) which, when executed by the processor, causes the computer to bind subject data to a selected data access device such that the subject data is inaccessible to data access devices other than the selected data access device by:
  encrypting the subject data to form encrypted subject data using data corresponding to the selected data access device as an encryption key;
  forming key identification data from the encryption key; and
  storing the encrypted subject data and the key identification data in a storage medium which is readable by the selected data access device;
 wherein the encryption key is not directly determinable from data stored on the storage medium including the key identification data and the encrypted subject data.

70. The computer system of claim 69 wherein encrypting the subject data comprises:
 encrypting the subject data using a master key; and
 encrypting the master key with the encryption key to form an encrypted master key.

71. The computer system of claim 70 wherein storing the encrypted subject data and the key identification data further comprises:
 storing the encrypted master key in the storage medium.

72. The computer system of claim 71 wherein the binding module, when executed by the processor, causes the computer to bind subject data to a selected data access device such that the subject data is inaccessible to data access devices other than the selected data access device by also:
 forming message verification data using the key identification data and the encrypted master key; and
 storing the message verification data in the storage medium.

73. The computer system of claim 72 wherein the message verification data is a message authentication code (MAC).

74. The computer system of claim 69 wherein the binding module, when executed by the processor, causes the computer to bind subject data to a selected data access device such that the subject data is inaccessible to data access devices other than the selected data access device by also:
 forming message verification data using the key identification data; and
 storing the message verification data in the storage medium.

75. The computer system of claim 74 wherein the message verification data is a message authentication code (MAC).

76. The computer system of claim 69 wherein the subject data includes digitized audio signals.

77. The computer system of claim 69 wherein the data secretly held by selected data access device is read-only.

78. A computer system comprising:

a processor;

a memory operatively coupled to the processor; and a data access module (i) which executes in the processor from the memory and (ii) which, when executed by the processor, causes the computer to access subject data from a storage medium by a selected data access device by:

retrieving key identification data from the storage medium;

determining that the key identification data corresponds to data secretly held by the selected data access device;

retrieving encrypted subject data from the storage medium; and decrypting the encrypted subject data using the data secretly held by the selected data access device as an encryption key to form the subject data;

wherein the key identification data is formed from the encryption key; and wherein the encryption key is not directly determinable from data stored on the storage medium including the key identification data and the encrypted subject data.

79. The computer system of claim 78 wherein the storage medium is a removable storage medium.

80. The computer system of claim 78 wherein decryption comprises:

retrieving an encrypted master key from the storage medium;

decrypting the encrypted master key using the data secretly held by the selected data access device as an encryption key to form a master key; and decrypting the encrypted subject data using the master key to form the subject data.

81. The computer system of claim 78 wherein the data access module, when executed by the processor, causes the computer to access subject data from a storage medium by a selected data access device by also:

retrieving message verification data from the storage medium; and verifying authenticity of the key identification data using the message verification data.

82. The computer system of claim 81 wherein the message verification data is a message authentication code (MAC).

83. The computer system of claim 78 wherein the subject data includes digitized audio signals.

84. The computer system of claim 83 wherein the data access module, when executed by the processor, causes the computer to access subject data from a storage medium by a selected data access device by also:

playing back the digitized audio signals.

85. The computer system of claim 78 wherein the subject data includes digitized video signals.

86. The computer system of claim 85 wherein the data access module, when executed by the processor, causes the computer to access subject data from a storage medium by a selected data access device by also:

rendering the digitized video signals.

87. The computer system of claim 78 wherein the subject data includes computer code.

88. The computer system of claim 87 wherein the data access module, when executed by the processor, causes the computer to access subject data from a storage medium by a selected data access device by also:

executing the computer code.

89. A computer system comprising:

a processor;

a memory operatively coupled to the processor; and a data access module (i) which executes in the processor from the memory and (ii) which, when executed by the processor, causes the computer to access subject data from a storage medium by a selected data access device by:

receiving key data corresponding to a second data access device from the second data access device;

retrieving key identification data from the storage medium;

determining that the key identification data corresponds to the key data received from the second data access device, retrieving encrypted subject data from the storage medium; and decrypting the encrypted subject data using the key data received from the second data access device as an encryption key to form the subject data.

90. The computer system of claim 89 wherein the storage medium is a removable storage medium.

91. The computer system of claim 89 wherein decrypting comprises retrieving an encrypted master key from the storage medium;

decrypting the encrypted master key using the data secretly held by the selected data access device as an encryption key to form a master key; and decrypting the encrypted subject data using the master key to form the subject data.

92. The computer system of claim 89 wherein receiving key data corresponding to a second data access device comprises:

sending a request message to the second data access device requesting key data from the second data access device;

receiving a reply message from the second data access device which includes encrypted key data;

decrypting the encrypted key data to form the key data.

93. The computer system of claim 92 wherein receiving key data corresponding to a second data access device further comprises:

sending an exchange massage to the second data access device where the exchange message includes encrypted key data corresponding to the selected data access device.

94. The computer system of claim 92 wherein receiving key data corresponding to a second data access device further comprises:

receiving a terminate message from the second data access device.

95. The computer system of claim 92 wherein receiving key data corresponding to a second data access device further comprises:

preventing storage of the key data within the selected data access device upon a condition in which equivalent key data is already stored within the selected data access device.

96. The computer system of claim 92 wherein the request message includes a pseudo-random number.

97. The computer system of claim 96 wherein the reply message include the first-mentioned pseudo-random number and a second pseudo-random number.

98. The computer system of claim 92 wherein the request message includes a certificate of the selected data access device.

99. The computer system of claim 92 wherein the request message conveys a public key of the selected data access device to the second data access device.

100. The computer system of claim 99 wherein decrypting the encrypted key data comprises:

decrypting the encrypted key data using the private key of the selected data access device to form the key data.

101. The computer system of claim 89 wherein receiving key data corresponding to a second data access device comprises:

receiving a request message from the second data access device requesting key data from the selected data access device;

sending a reply message to the second data access device which includes encrypted key data;

receiving an exchange message from the second data access device which includes other encrypted key data; and decrypting the other encrypted key data to form the key data.

102. The computer system of claim 89 wherein the encryption key is not directly determinable from data stored on the storage medium including the key identification data and the encrypted subject data.

* * * * *